United States Patent [19]

Saitoh et al.

[11] 4,064,098

[45] Dec. 20, 1977

[54] GLASS FIBER-REINFORCED POLY(TETRAMETHYLENE TEREPHTHALATE) RESIN COMPOSITION

[75] Inventors: Seiichiroh Saitoh, Ohtake; Masatoshi Kashiwagi, Waki; Toshiaki Marubayashi, Suita, all of Japan

[73] Assignee: Mitsui Petrochemical Industries Ltd., Tokyo, Japan

[21] Appl. No.: 736,146

[22] Filed: Oct. 27, 1976

[30] Foreign Application Priority Data

Oct. 27, 1975 Japan .................................. 50-128349

[51] Int. Cl.$^2$ .............................................. C08K 3/40
[52] U.S. Cl. ................................ 260/40 R; 260/860
[58] Field of Search ........................ 260/860, 40 R

[56] References Cited

U.S. PATENT DOCUMENTS

| | | |
|---|---|---|
| 3,814,725 | 6/1974 | Zimmerman et al. ............. 260/40 R |
| 3,907,926 | 9/1975 | Brown et al. ..................... 260/860 |
| 3,963,800 | 6/1976 | Gipp et al. ....................... 260/860 |

*Primary Examiner*—Sandra M. Person
*Attorney, Agent, or Firm*—Sherman & Shalloway

[57] ABSTRACT

A glass fiber-reinforced polyester resin composition consisting of: (A) about 55 to about 95% by weight, based on the total weight of (A) and (B), of poly(tetramethylene terephthalate) resin and a glycol component unit, (B) about 45 to about 5% by weight, based on the total weight of (A) and (B), of a copolyester resin composed of a dicarboxylic acid component unit and a unit of a mixed glycol consisting of a specific ether glycol, and a monoalkylene glycol, the amount X in mole % of the ether glycol being expressed by the formula $12/n \leq X \leq 150/n$ wherein $n$ is an integer of 2 to 6, and the amount of the monoalkylene glycol being (100 - X) mole %, (C) about 10 to about 50 parts by weight, per 100 parts by weight of the sum of (A) and (B), of glass fibers, and (D) up to about 50 parts by weight, per 100 parts by weight of the sum of (A) and (B), of an additive.

8 Claims, No Drawings

GLASS FIBER-REINFORCED POLY(TETRAMETHYLENE TEREPHTHALATE) RESIN COMPOSITION

This invention relates to a glass fiber-reinforced poly(tetramethylene terephthalate) resin composition having improved properties which have overcome the disadvantages of the above polyester resin composition in the form of a shaped article, such as the peeling tendency of a coating formed thereon by a coating agent such as a paint or lacquer or the occurrence of "warping," without sacrificing its desirable properties.

Glass fiber-reinforced poly(tetramethylene terephthalate) resin compositions in the form of shaped articles have found use as engineering plastics because of their superior mechanical characteristics, heat stability and chemical resistance and good moldability, and attempts have been made to use them as metal substitutes in electric, automobile, and other fields. However, the shaped articles of the glass fiber-reinforcing poly(tetramethylene terephthalate) resin composition develop "warping" because of their anisotropy in internal stress, and deform or have poor dimensional precision. This defect is ascribable to the fact that there is a difference in shrinkage between the glass fibers and the polyester resin when cooling and solidifying the molten resin at the time of shaping, and shrinkage differs from direction to direction owing to the crystallization of the resin and the orientation of the glass fibers. Furthermore, these polyester resin compositions have the defect that a firmly bonded coating is difficult to form thereon by a coating agent such as a paint or lacquer. These defects have imposed a great restriction on the utilization of the shaped articles of such a polyester resin as metal substitutes in the fields mentioned.

In an attempt to prevent the occurrence of "warping" phenomenon in shaped articles of the glass fiber-reinforced poly(tetramethylene terephthalate) resin composition, methods have been suggested so far in which polycarbonates, styrene polymers, methacrylic acid polymers, and polyethylene terephthalate, etc. are added to the polyester resin (see, for example, Japanese Laid-Open Publications Nos. 78255/73, 1146/75, and 90345/74 and Japanese Patent Publication No. 33832/75). Shaped articles of the compositions suggested in the above-cited patent literature have some effect of inhibiting warping, but the effect is still unsatisfactory. Moreover, they tend to sacrifice their favorable properties such as mechanical characteristics and heat stability, and the results are all the more unsatisfactory. On the other hand, no feasible suggestion has ever been made as to the improvement of the coatability of the glass fiber-reinforced poly (tetramethylene terephthalate) resin composition.

The present inventors made investigations in an attempt to provide a glass fiber-reinforced poly(tetramethylene terephthalate) resin composition having improved coatability and reduced warping without deteriorating its desirable properties such as heat stability, mechanical characteristics and moldability. These investigations led to the discovery that a glass fiber-reinforced poly(tetramethylene terephthalate) resin composition consisting essentially of (A) a major amount of poly(tetramethylene terephthalate), (B) a copolyester resin consisting of a dicarboxylic acid component and a mixed glycol composed of an ether glycol and a monoalkylene glycol, and (C) glass fibers and optionally containing (D) additives serve to overcome the disadvantages of the conventional glass fiber-reinforced poly(tetramethylene terephthalate) resin compositions.

It was further found that when a similar polyester polyether block copolymer, or polyethylene terephthalate is used instead of the copolyester resin (B) in the above composition, no improvement of the coatability can be expected. Moreover, they found that when the polyester-polyether block copolymer is used in an amount to bring about an effect of somewhat inhibiting warping, the resulting composition has deteriorated chemical resistance, heat stability and mechanical strength, and that when polyethylene terephthalate is used, the crystallization of poly(tetramethylene terephthalate) is hampered, and the heat stability and mechanical strength of the resulting composition are deteriorated.

It is an object of this invention therefore to provide a glass fiber-reinforced poly(tetramethylene terephthalate) resin composition having improved coatability and reduced warping without sacrificing its desirable properties.

The above and other objects and advantages of the present invention will become apparent from the following description.

According to the present invention, there is provided a glass fiber-reinforced polyester resin composition which consists of:

A. about 55 to about 95% by weight, based on the total weight of (A) and (B), of poly(tetramethylene terephthalate) resin composed of a dicarboxylic acid component unit at least 90 mole% of which consists of terephthalic acid and a glycol component unit at least 90 mole% of which consists of tetramethylene glycol, B. about 45 to about 5% by weight, based on the total weight of (A) and (B), of a copolyester resin composed of a dicarboxylic acid component unit at least 90 mole% of which consists of terephthalic acid and a unit of a mixed glycol consisting of an ether glycol of the formula $HO(CH_2CH_2O)_nH$ in which $n$ is an integer of 2 to 6, and a monoalkylene glycol containing not more than 6 carbon atoms, the amount X in mole% of the ether glycol being expressed by the formula $12/n \leq X \leq 150/n$ in which $n$ is the same as defined above, and the amount of the monoalkylene glycol being $(100 - X)$ mole%, C. about 10 to about 50 parts by weight, per 100 parts by weight of the sum of (A) and (B), of glass fibers, and D. up to about 50 parts by weight, per 100 parts by weight of the sum of (A) and (B), of an additive.

The polyester resin component which constitutes the polyester resin composition of this invention is composed of the polyester resin (A) and the copolyester resin (B).

The polyester resin (A) consists of a dicarboxylic acid component unit at least 90 mole% of which consists of terephthalic acid and a glycol component unit at least 90 mole% of which consists of tetramethylene glycol. Examples of another dicarboxylic acid component contained in an amount of not more than 10 mole% include phthalic acid, isophthalic acid, hexahydroterephthalic acid, naphthalene dicarboxylic acid, adipic acid, sebacic acid, and azelaic acid. Examples of another glycol component which may be contained in an amount of not more than 10 mole% include ethylene glycol, trimethylene glycol, and pentamethylene glycol. It should be noted however that ether glycols including those expressed by the formula HO(CH$_2$CH$_2$O)$_n$H are not included within the definition of the other glycol mentioned. Preferably, the dicarboxylic acid component consists solely of terephthalic acid, and the glycol component, solely of tetramethylene glycol.

The copolyester resin (B) is composed of a dicarboxylic acid component unit at least 90 mole% of which consists of terephthalic acid, and a unit of a mixed glycol component consisting of an ether glycol of the formula HO(CH$_2$CH$_2$O)$_n$H wherein $n$ is an integer of 2 to 6 and a monoalkylene glycol containing not more than 6 carbon atoms. Other dicarboxylic acids which can be included in an amount of up of 10 mole% are the same as those stated hereinabove. Specific examples of the ether glycol include diethylene glycol, triethylene glycol, and polyethylene glycols having 4 to 6 recurring units (CH$_2$CH$_2$O). Preferred ether glycols are diethylene glycol, triethylene glycol, the latter being especially preferred. Examples of the monoalkylene glycol, on the other hand, include ethylene glycol, 1,3-propylene glycol, tetramethylene glycol, and pentamethylene glycol. Ethylene glycol is especially preferred.

The amount (X mole%) of the ether glycol of the above formula must meet the following expression:

$$12/n \leq X \leq 150/n$$

wherein $n$ is an integer of 2 to 6, and the amount of the alkylene glycol is $(100 - X)$ mole%. For example, when the ether glycol is diethylene glycol ($n=2$), the amount of the diethylene glycol is 6 to 75 mole%, preferably 12 to 60 mole%. When it is triethylene glycol ($n=3$), the amount of the triethylene glycol is 4 to 50 mole%, preferably 8 to 40 mole%. If the amount of the ether glycol is below the lower limit specified above, the effect of improving coatability and reducing warping is poor. On the other hand, if it exceeds the upper limit, the heat stability of the copolyester resin (B) is reduced extremely, which in turn causes a marked reduction in the heat stability of the glass fiber-reinforced polyester resin composition of this invention. The copolyester resin (B) is a rigid thermoplastic copolyester resin having the above composition. It has been unknown heretofore that the occurrence of warping and poor coatability in glass fiber-reinforced poly(tetramethylene terephthalate) resin compositions can be obviated by incorporating the copolyester resin (B).

The use of a polyester-polyether block copolymer instead of the copolyester resin (B) cannot achieve the improvement intended by the present invention. Such as block copolymer is an elastomer composed of a poly(alkylene terephthalate) having a molecular weight of about 400 and a poly(alkylene glycol) having a molecular weight of about 6,000, and differs in composition from the copolyester resin (B) in accordance with this invention. Furthermore, the polyester-polyether block copolymer is quite ineffective when added in a small amount to the glass fiber-reinforced poly(tetramethylene terephthalate) resin composition. When it is added in larger amounts which can lead to an appreciable effect or inhibiting "warping," the chemical resistance, heat stability and mechanical strength of the resulting composition are deteriorated, as will be shown hereinbelow in Comparative Example 4.

When polyethylene terephthalate is added to the glass fiber-reinforced poly(tetramethylene terephthalate) resin composition instead of the copolyester resin (B), the crystallization of the poly(tetramethylene terephthalate) is hampered, and the heat stability and mechanical strength of the resulting composition are deteriorated and no improvement in coatability can be achieved.

The copolyester resin (B) used in the present invention can be produced by various methods known to produce polyethylene terephthalate. They include, for example, a method comprising polycondensing terephthalic acid, a monoalkylene glycol and an ether glycol by directesterification, and a method which comprises polycondensing a functional derivative of terephthalic acid such as a dialkyl terephthalate, a monoalkylene glycol, and an ether glycol by ester-interchange reaction.

The mixing ratio between the poly(tetramethylene terephthalate) resin (A) and the copolyester resin (B) is such that the amount of the polyester resin (A) is about 55 to about 95% by weight, and the amount of the copolyester resin (B) is about 45 to about 5% by weight, both based on the total weight of (A) and (B). If the amount of the copolyester resin (B) is less than about 5% by weight, the desired effect of improvement is difficult to achieve, and if it is larger than about 45% by weight, the desirable properties such as heat stability and chemical resistance of the glass fiber-reinforced poly(tetramethylene terephthalate) resin composition are deteriorated. Preferably, the amount of the polyester resin (A) is about 70 to about 90% by weight, and the amount of the copolyester resin (B) is about 10 to about 30% by weight.

The glass fibers (C) are those having a diameter of about 5 to about 20 microns and a length of about 0.5 to 25 mm which are usually employed for reinforcing thermoplastic resins. The glass fibers may be surface-treated with aminosilane, epoxysilane, borane, vinylsilane, or methacrylosilane, etc.

The amount of the glass fibers to be incorporated in the composition of this invention is about 10 to about 50 parts by weight, preferably about 10 to about 30 parts by weight per 100 parts by weight of the sum of (A) and (B). If the amount is less than about 10 parts by weight, the reinforcing effect is not sufficient, and amounts exceeding about 50 parts by weight deteriorate the flowability and moldability of the resulting composition.

The composition of this invention may further contain up to 50 parts by weight, per 100 parts by weight of the sum of (A) and (B), of an additive (D). Examples of the additive are weatherability stabilizers such as 2,2,4-trimethylhydroquinone, n-octadecyl-β-(4'-hydroxy-3',5'-ditert.butyl phenyl) propionate, tetrakis methylene (3,5-ditert.butyl-4-hydroxy-hydrocinnamate) butane, and 4,4'-thiobis(6-tert.butyl-m-cresol); lubricants such as calcium stearate and stearic acid monoglyceride; antistatic agents such as pentaerithritol monostearate, sorbitan monopalmitate, sulfated oleic acid, and lauryl trimethylammonium chloride; coloring agents such as carbon black, titanium oxide, zinc oxide, cadmium red, ultramarine, copper phthalocyanine type pigments, quinacridone type pigments, and azo type pigments; nucleating agents such as sodium benzoate; fire retardants such as antimony oxide, tricresyl phosphate, trischloroethyl phosphate, tris dichloropropyl phosphate, tetrabromoethane, and dibromodichloropropane; antioxidants such as 1,1,3-tris(5-tert.butyl-4-hydroxy-2-methylphenyl) butane, 2,2'-methylenebis(4-ethyl-6-tert.butyl phenol) and 2,6-di-tert.butyl-p-cresol; and fillers such as asbestos, talc, glass powder, glass beads, clay, mica, diatomaceous earth, silica, calcium carbonate, calcium sulfate, and barium sulfate.

The amount of the additive (D) can be varied as desired according to the type of the additive and the purpose of using it. For example, the amount is about 0.01 to about 5 parts by weight for weatherability stabilizers, lubricants, antistatic agents, coloring agents, nucleating agents, fire retardants, and antioxidants, and amount 1 to about 50 parts by weight for fillers.

The glass fiber-reinforced polyester resin composition of this invention can be prepared by various known methods which include, for example, a method comprising mixing chips of the polyester resin (A) and the copolyester (B) with glass fibers (C) by, for example, a V-type blender, ribbon blender, or Henschel mixer, and then melt-mixing them by an extruder or a kneader; a method comprising melt-mixing the polyester resin (A) and the copolyester resin (B), mixing the resulting resin chips with glass fibers (C) using a V-type blender, ribbon blender or Henschel, mixer, and then melt-mixing them by an extruder, for example; or a method comprising extrusion coating a molten mixture of the polyester resin (A) and the copolyester resin (B) on a glass roving in a manner of cable jacketing, and then cutting the resulting strand to suitable lengths. The resin composition obtained by such a method can be shaped into articles of the desired shape by various molding techniques such as injection molding or extrusion.

Since the glass fiber-reinforced polyester resin composition of this invention has reduced warping in molded articles and improved coatability without impairing its desirable properties such as superior mechanical strength, heat stability and chemical resistance, its utility as engineering plastics can be broadened. For example, the composition in accordance with this invention can replace metallic material in the fields of component parts of precision machines, and inner and outer decorative parts of automobiles.

The following Examples illustrate the present invention more specifically. It should be noted however that the invention is in no way limited to these examples.

EXAMPLE 1

Dimethyl terephthalate (100 moles), 180 moles of ethylene glycol and 20 moles of triethylene glycol were reacted at 230° C. for 3 hours using tetrabutoxy titanate as a catalyst. After a predetermined amount of methanol flowed out, the polycondensation was further performed at 275° C. and less than 1.0 mmHg for 3 hours. The resulting copolyester had an intrinsic viscosity (o-chlorophenol, 1%, 25° C.) of 0.60 and an ethylene glycol/triethylene glycol molar ratio in the glycol component of 80/20.

20 Parts by weight of chips of the copolyester were mixed with 50 parts by weight of chips of poly(tetramethylene terephthalate) (PTMT for short) having an intrinsic viscosity of 0.90 and 30 parts by weight of glass fibers with a length of 6 mm and a diameter of 13$\mu$ treated with vinylsilane by a V-type blender. The mixture was pelletized at 250° C. using an extruder with a screw diameter of 65 mm. The pellets were molded by a screw-in-line injection molding machine into a rectangular plate (side gate) having a length of 120 mm, a width of 130 mm and a thickness of 2 mm, and test pieces. The molding conditions were as follows: the resin temperature 270° C.; the die temperature 70° C.; the injection pressure 1,000 kg/cm$^2$; and the molding cycle 60 seconds. The warping and coatability were evaluated using a rectangular plate, and the physical properties were evaluated using the test pieces. The tensile strength was measured by the method of ASTMD-638; the flexural modulus, by the method of ASTM-D-790; and the impact strength, by the method of measuring the notched Izod impact strength in ASTM-D-256. The heat distortion temperature was measured at a load of 18.6 kg/cm$^2$ by the method of ASTM-D-648. The warping of the rectangular plate was determined by using specimen which had been allowed to stand for 48 hours at 23° C. and a relative humidity of 55%, placing the specimen on a planar surface, contacting any three apexes of the under portion of the rectangular plate with the surface, and measuring the distance from the remaining apex to the plane. The maximum value obtained was made the warping of the specimen.

THe coatability was evaluated by the following method. Each of commercially available aminoalkyd-type overcoating paint (white) and acrylic-type overcoating paint (brown) was diluted to two times with p-xylene, and sprayed onto the test specimen by a sprayer, followed by setting at room temperature for 30 minutes, and baking the coating at 140° C. for 30 minutes.

The resulting coated specimen was allowed to stand for 24 hours in a constant temperature chamber, and the adhesion of the coating was evaluated by an Erichsen test. In the results shown, 100/100 means that squares resulting from the division of the surface of the specimen were not peeled off at all in a peel test using an adhesive tape, and 0/100 means that all of the squares were peeled off. Only those molded articles which show 100/100 in this test are feasible for practical purposes.

EXAMPLES 2 and 3

Example 1 was repeated except that each of copolyesters having the compositions of shown in Table 1 was used.

EXAMPLE 4

Example 1 was repeated except that the amounts of the copolyester and PTMT used in Example 1 were changed to 30 and 40 parts by weight, respectively.

COMPARATIVE EXAMPLE 1

Example 1 was repeated except that the use of the copolyester used in Example 1 was omitted, and the amounts of PTMT used in Example 1 was changed to 70 parts by weight.

COMPARATIVE EXAMPLE 2

Dimethyl terephthalate (100 moles), 140 moles of ethylene glycol and 60 moles of triethylene glycol were polycondensed in the same way as in Example 1 to form a copolyester having an intrinsic viscosity of 0.77 and an ethylene glycol/triethylene glycol molar ratio of 40/60. Example 1 was repeated except using this copolyester.

COMPARATIVE EXAMPLES 3

Example 1 was repeated except that 20 parts by weight of polyethylene terephthalate having an intrinsic viscosity of 0.55 obtained by the same method as in Example 1, 50 parts by weight of PTMT having an intrinsic viscosity of 0.90 and 30 parts by weight of glass fibers were used.

COMPARATIVE EXAMPLE 4

Example 1 was repeated except that a composition consisting of 50 parts by weight of PTMT having an intrinsic viscosity of 0.90, 20 parts of a polyester-polyether block copolymer (Hytrel 4055, a trademark for a product of E. I. du Pont de Nemours & Co.), and 30 parts by weight of glass fibers was used.

EXAMPLE 5

Example 1 was repeated except that a copolyester of the composition shown in Table 1 which had been produced by the same method as in Example 1 was used.

EXAMPLE 6

Example 1 was repeated except that 26 parts by weight of the copolyester, 64 parts by weight of PTMT and 10 parts by weight of the glass fibers were used.

EXAMPLE 7

Example 1 was repeated except that 7 parts by weight of the copolyester, 63 parts of PTMT and 30 parts by weight of the glass fibers were used.

EXAMPLE 8

Example 1 was repeated except that a copolyester of the composition shown in Table 1 which had been produced by the same method as in Example 1 was used.

EXAMPLE 9

Example 1 was repeated except that 30 parts by weight of a copolyester of the composition shown in Table 1, 40 parts by weight of PTMT and 30 parts by weight of the glass fibers were used.

EXAMPLE 10

Example 1 was repeated except that a copolyester of the composition shown in Table 1 which had been produced by the same method as in Example 1 was used.

COMPARATIVE EXAMPLE 5

Example 1 was repeated except that 42 parts of the same copolyester as used in Example 1, 28 parts by weight of PTMT and 30 parts by weight of the glass fibers were used.

COMPARATIVE EXAMPLE 6

Example 1 was repeated except that the amounts of the copolyester and PTMT were changed to 30 and 70 parts by weight, respectively, and no glass fiber was used.

COMPARATIVE EXAMPLE 7

Example 1 was repeated except that 70 parts by weight of the copolyester and 30 parts by weight of the glass fibers were used, and the use of PTMT was omitted.

COMPARATIVE EXAMPLE 8

Example 1 was repeated except that a copolyester of the composition shown in Table 1 which had been produced by the same method as in Example 1 was used.

The results obtained in the above Examples and Comparative Examples are shown in Table 1.

Example 1

| | Examples or Comparative Examples | | Example 1 | Example 2 | Example 3 | Example 4 | Comparative Example 1 |
|---|---|---|---|---|---|---|---|
| Composition | PTMT | parts by weight | 50 | 50 | 50 | 40 | 70 |
| | Glass fibers | " | 30 | 30 | 30 | 30 | 30 |
| Copolyester resin | Dicarboxylic acid | — | TA | TA | TA | TA | — |
| | Alkylene glycol (Y) | — | EG | EG | EG | EG | — |
| | Ether glycol (Z) | — | TEG | TEG | TEG | TEG | — |
| | (Y)/(Z) molar ratio | | 80/20 | 90/10 | 60/40 | 80/20 | — |
| | Amount added | parts by weight | 20 | 20 | 20 | 30 | 0 |
| Properties | Tensile strength | kg/cm$^2$ | 1200 | 1230 | 1100 | 1180 | 1250 |
| | Flexural modulus | × 10$^4$ kg/cm$^2$ | 9.1 | 9.3 | 8.5 | 8.3 | 8.7 |
| | Izod impact strength | kg. cm/cm$^2$ | 9 | 9 | 9 | 8 | 7 |
| | Heat distortion temperature | °C. | 200 | 207 | 185 | 187 | 210 |
| | Coatability | | | | | | |
| | Aminoalkyd paint | — | 100/100 | 100/100 | 100/100 | 100/100 | 0/100 |
| | Acrylic paint | — | 100/100 | 100/100 | 100/100 | 100/100 | 98/100 |
| | Warping | mm | 5.0 | 4.0 | 8.4 | 2.0 | 17.2 |

| | Examples or Comparative Examples | | Comparative Example 2 | Comparative Example 3 | Comparative Example 4 | Example 10 | Example 15 |
|---|---|---|---|---|---|---|---|
| Composition | PTMT | parts by weight | 50 | 50 | 50 | 50 | 50 |
| | Glass fibers | " | 30 | 30 | 30 | 30 | 70 |
| Copolyester resin | Dicarboxylic acid | — | TA | TA | | TA | TA |
| | Alkylene glycol (Y) | — | EG | EG | Polyester-polyether block copolymer | EG | EG |
| | Ether glycol (Z) | — | TEG | — | | Hex.EG | TEG |
| | (Y)/(Z) molar ratio | | 40/60 | 100/0 | | 90/10 | 92/8 |
| | Amount added | parts by weight | 20 | 20 | 20 | 20 | 20 |
| Properties | Tensile strength | kg/cm$^2$ | 410 | 1170 | 820 | 1020 | 1230 |
| | Flexural modulus | × 10$^4$ kg/cm$^2$ | 5.2 | 8.3 | 6.1 | 7.6 | 9.0 |
| | Izod impact strength | kg. cm/cm$^2$ | 10 | 7 | 10 | 7 | 9 |
| | Heat distortion temperature | °C. | 148 | 193 | 170 | 179 | 204 |
| | Coatability | | | | | | |
| | Aminoalkyd paint | — | 100/100 | 0/100 | 0/100 | 100/100 | 100/100 |
| | Acrylic paint | — | 100/100 | 99/100 | 100/100 | 100/100 | 100/100 |
| | Warping | mm | 9.6 | 10.5 | 12.0 | 6.5 | 5.5 |

| | Examples or Comparative Examples | | Example 8 | Example 6 | Example 7 | Example 9 | Comparative Example 8 |
|---|---|---|---|---|---|---|---|
| Composition | PTMT | parts by weight | 50 | 64 | 63 | 40 | 50 |
| | Glass fibers | " | 30 | 10 | 30 | 30 | 30 |
| Copolyester | Dicarboxylic acid | — | TA | TA | TA | TA | TA |
| | Alkylene glycol (Y) | — | EG | EG | EG | EG | EG |
| | Ether glycol (Z) | — | DEG | TEG | TEG | DEG | PEG |
| | (Y)/(Z) molar ratio | | 85/15 | 80/20 | 80/20 | 80/20 | 95/5 |

Example 1-continued

|  |  |  |  |  |  |  |  |
|---|---|---|---|---|---|---|---|
| Properties | Amount added | parts by weight | 20 | 26 | 7 | 30 | 20 |
|  | Tensile strength | kg/cm$^2$ | 1190 | 980 | 1220 | 1140 | 620 |
|  | Flexural modulus | × 10$^4$ kg/cm$^2$ | 9.0 | 3.9 | 9.1 | 8.6 | 5.7 |
|  | Izod impact strength | kg. cm/cm$^2$ | 8 | 4 | 7 | 7 | 10 |
|  | Heat distortion temperature | ° C. | 196 | 191 | 208 | 189 | 126 |
|  | Coatability |  |  |  |  |  |  |
|  | Aminoalkyd paint | — | 100/100 | 100/100 | 100/100 | 100/100 | Baking impossible |
|  | Acrylic paint | — | 100/100 | 100/100 | 100/100 | 100/100 |  |
|  | Warping | mm | 7.3 | 1.3 | 9.4 | 7.2 | 12.4 |

| Examples or Comparative Examples |  |  | Comparative Example 6 | Comparative Example 7 | Comparative Example 5 |
|---|---|---|---|---|---|
| Composition | PTMT | parts by weight | 70 | 0 | 28 |
|  | Glass fibers | " | 0 | 30 | 30 |
| Copolyester resin | Dicarboxylic acid | — | TA | TA | TA |
|  | Alkylene glycol (Y) | — | EG | EG | EG |
|  | Ether glycol (Z) | — | TEG | TEG | TEG |
|  | (Y)/(Z) molar ratio |  | 80/20 | 80/20 | 80/20 |
|  | Amount added | parts by weight | 30 | 70 | 42 |
| Properties | Tensile strength | kg/cm$^2$ | 610 | 1050 | 1120 |
|  | Flexural modulus | × 10$^4$ kg/cm$^2$ | 2.4 | 7.5 | 8.0 |
|  | Izod impact strength | kg. cm/cm$^2$ | 3 | 8 | 8 |
|  | Heat distortion temperature | ° C. | 55 | 145 | 158 |
|  | Coatability |  |  |  |  |
|  | Aminoalkyl paint | — | Bakin | Baking | Baking |
|  | Acrylic paint | — | impossible | impossible | impossible |
|  | Warping | mm | 0 | 2.3 | 2.2 |

The abbreviations used in Table 1 have the following meanings.
TA: terephthalic acid
EG: ethylene glycol
TEG: triethylene glycol
DEG: diethylene glycol
PEG: polyethylene glycol with a molecular weight of 400
HeX.EG: hexaethylene glycol
Baking impossible: The specimen deforms at the time of baking.

What we claim is:

1. A glass fiber-reinforced polyester resin composition consisting of:
   A. about 55 to about 95% by weight, based on the total weight of (A) and (B), of poly(tetramethylene terephthalate) resin composed of a dicarboxylic acid component unit at least 90 mole% of which consists of terephthalic acid and a glycol component unit at least 90 mole% of which consists of tetramethylene glycol,
   B. about 45 to about 5% by weight, based on the total weight of (A) and (B), of a copolyester resin composed of a dicarboxylic acid component unit at least 90 mole% of which consists of terephthalic acid and a unit of a mixed glycol consisting of an ether glycol of the formula HO(CH$_2$CH$_2$O)$_n$H wherein $n$ is an integer of 2 to 6, and a monoalkylene glycol containing not more than 6 carbon atoms, the amount X in mole% of the ether glycol being expressed by the formula $12/n \leq X \leq 150/n$ wherein $n$ is the same as defined above, and the amount of the monoalkylene glycol being (100 − X) mole%,
   C. about 10 to about 50 parts by weight, per 100 parts by weight of the sum of (A) and (B), of glass fibers, and
   D. up to about 50 parts by weight, per 100 parts by weight of the sum of (A) and (B), of an additive.

2. The composition of claim 1 wherein said dicarboxylic acid component unit of the polyester (A) contains another dicarboxylic acid selected from the group consisting of phthalic acid, isophthalic acid, hexahydroterephthalic acid, naphthalenedicarboxylic acid, adipic acid, sebacic acid and azelaic acid, and said glycol component unit contains another monoalkylene glycol selected from the group consisting of ethylene glycol, trimethylene glycol and pentamethylene glycol.

3. The composition of claim 1 wherein said dicarboxylic acid component of the copolyester resin (B) contains another dicarboxylic acid selected from the group consisting of phthalic acid, isophthalic acid, hexahydroterephthalic acid, naphthalenedicarboxylic acid, adipic acid, sebacic acid and azelaic acid.

4. The composition of claim 1 wherein said ether glycol is a member selected from the group consisting of diethylene glycol, triethylene glycol and polyethylene glycols containing 4 to 6 (CH$_2$CH$_2$O) recurring units, and said monoalkylene glycol containing not more than 6 carbon atoms is a member selected from the group consisting of ethylene glycol, 1,3-propylene glycol, tetramethylene glycol and pentamethylene glycol.

5. The composition of claim 1 wherein in component (A) the dicarboxylic acid component consists solely of terephthalate acid and the glycol component consists solely of tetramethylene glycol.

6. The composition of claim 4 wherein said ether glycol is diethylene glycol and the amount, in mol%, of the ether glycol is from 12 to 60 mol%.

7. The composition of claim 4 wherein said ether glycol is triethylene glycol and the amount, in mol%, of the ether glycol is 8 to 40 mol%.

8. The composition of claim 1 wherein the amount of the polyester resin (A) is about 70 to about 90% by weight, and the amount of the copolyester resin (B) is about 10 to about 30% by weight.